US006797403B2

(12) United States Patent
Clark et al.

(10) Patent No.: US 6,797,403 B2
(45) Date of Patent: Sep. 28, 2004

(54) CONTINUOUS EXTRUDED LEAD ALLOY STRIP FOR BATTERY ELECTRODES

(75) Inventors: Douglas G. Clark, Hamilton (CA); Kenneth Henning Runo Gustavsson, Åkersberga (SE); Derek William Russell, Beaconsfield (GB); Albert M. Vincze, Oakville (CA)

(73) Assignee: Teck Cominco Metals Ltd., Vancouver (CA)

( * ) Notice: Subject to any disclaimer, the term of this patent is extended or adjusted under 35 U.S.C. 154(b) by 110 days.

(21) Appl. No.: 10/079,127

(22) Filed: Feb. 21, 2002

(65) Prior Publication Data

US 2002/0157743 A1 Oct. 31, 2002

(30) Foreign Application Priority Data

Feb. 26, 2001 (CA) .............................................. 2338168

(51) Int. Cl.[7] .............................. C22F 1/12; H01M 4/16
(52) U.S. Cl. ...................... 428/596; 148/400; 148/706; 29/6.1; 429/226
(58) Field of Search ................................. 148/706, 400; 29/6.1, 6.2; 429/225, 226; 428/596

(56) References Cited

U.S. PATENT DOCUMENTS

| 3,189,989 A | * | 6/1965 | Ebdon ........................ 419/20 |
| 3,693,394 A | * | 9/1972 | Runevall et al. ............... 72/262 |
| 3,756,312 A | * | 9/1973 | Shah et al. ................... 165/206 |
| 3,929,513 A | * | 12/1975 | Mao ............................ 148/538 |
| 4,332,629 A |   | 6/1982 | McWhinnie ........... 148/11.5 R |
| 4,658,623 A | * | 4/1987 | Blanyer et al. ............... 72/268 |
| 4,865,933 A |   | 9/1989 | Blanyer et al. ............. 429/241 |
| 5,611,128 A | * | 3/1997 | Wirtz ............................ 29/2 |
| 5,925,470 A | * | 7/1999 | Blanyer et al. ............. 428/607 |
| 5,964,904 A | * | 10/1999 | Jin et al. .................... 29/623.5 |
| 6,342,110 B1 | * | 1/2002 | Palumbo ..................... 148/400 |

FOREIGN PATENT DOCUMENTS

| EP | 0795917 A2 | * | 9/1997 |
| EP | 0795918 A2 | * | 9/1997 |
| GB | 1187305 |   | 4/1970 |
| JP | 61-114470 | * | 6/1986 |

OTHER PUBLICATIONS

Chemical Abstracts Service Columbus, Ohio, U.S. entitled "Creep Behaviour of Lead and Lead Alloys in Practical Application" by Hofmann, Wilhelm; Von Malotki, H., (1964) no month.

* cited by examiner

Primary Examiner—John J. Zimmerman
(74) Attorney, Agent, or Firm—Arne I. Fors

(57) ABSTRACT

A method of producing lead alloy strip for fabrication of positive and negative electrodes of a lead-acid battery by extruding a lead alloy at elevated temperature to produce a lead alloy strip having a desired profile and rapidly cooling the extruded strip to acquire a desired microstructure. Battery grids produced from the lead alloy strip have reduced vertical growth and enhanced resistance to corrosion.

14 Claims, 9 Drawing Sheets

CONTINUOUS EXTRUDED LEAD ALLOY STRIP FOR BATTERY ELECTRODES

BACKGROUND OF THE INVENTION (i) Field of the Invention

This invention relates to the continuous production of lead alloy strip and, more particularly, relates to the continuous high-speed extrusion of lead alloy strip for use as positive and negative electrodes of a lead-acid battery. The strip has a highly controlled microstructure which increases battery life by reducing the rate of vertical growth in the positive plate and reduces the rate of corrosion when compared with plates produced by other continuous processes. By reducing growth in the positive plate and by minimizing and forming a desired strip profile (e.g. by varying or tapering thickness from top to bottom of the strip) for the positive and negative alloy strip, the mass of both the positive and negative plates can be reduced, thereby reducing the overall weight and cost of batteries.

(ii) Description of the Related Art

In the production of lead-acid batteries there are several methods to produce the positive and negative grids used in the battery. In the continuous production of grids for lead-acid batteries these processes are limited to the production of either a rolled or cast strip which is punched or expanded by either reciprocating or rotary expansion processes or to the direct casting of grids, such as by the Concast™ process.

The production of lead alloy strip for use as positive battery plates having limited plate growth is extremely important because plate growth can cause cell short circuits.

This is a leading factor in shortening battery life in batteries made by continuous processes. The strip produced by conventional method such as rolling or continuous casting typically have a highly heterogenous microstructure with non-uniform grain sizes and shapes leading to undesirable plate growth and to corrosive attack from the battery electrolyte.

The production of strip for negative plates also is commonly done by either continuous cast or rolling processes. The negative electrode is not subjected to corrosive attack due to the electrochemical characteristics of the electrode, and therefore the main focus of the negative strip is reducing the weight of the negative plate, while maintaining adequate conductivity. This is done by simply making the strip thinner; however if the lug is too thin there are problems in battery manufacturing, related to melting of lugs into the top lead.

The extrusion of lead and lead alloys to provide a protective sheath on submersible cables to protect the cables from the corrosive effects of seawater, by means of extruding machines, has been done extensively in the past in the cable industry. Electrical cable is passed through the machine and a layer of lead alloy tube is extruded onto the cable. H. F. Sandelin is a world leader in the production of this type of machine. Other manufacturers include Pirelli, which produced a machine which is similar to the older Henley Extruder™ in utilizing a large horizontal screw. This type of apparatus has problems with alloy segregation and contamination of the screw.

U.S. Pat. No. 4,332,629 describes the production of lead-antimony alloy strip by ram-press extrusion. This process is limited to certain thicknesses and aspect ratios. Also, the process has limitations on production speed, this patent disclosing production rates of 6–10 ft/min. (1.9–3.2 kg/min.). Strip produced by ram press extrusion has had negative results regarding corrosion and grid growth in laboratory testing. Also this process does not provide control of microstructure and grain size and is limited to alloy selection.

SUMMARY OF THE INVENTION

The objective of the present invention is to provide an extrusion method and apparatus that can economically produce superior extruded lead alloy strip of a desired profile for the production of positive and negative battery plates that are resistant to both vertical grid growth and weight loss through corrosion in lead-acid batteries. The strip is produced at a speed that is competitive with continuous cast and rolled strip, the extruded strip having superior qualities in any of the following areas; corrosion induced growth, corrosion weight loss, shape, grid weight, cost, and automation compared to conventional technologies.

The preferred use of the invention is in the production of lead-alloy strip to be coiled for use in a continuous battery manufacturing line. This strip can be used to produce battery mesh by continuous reciprocating expansion of the strip into expanded mesh or by continuous rotary expansion of the strip into expanded mesh, such as disclosed in U.S. Pat. No. 4,315,356 issued Feb. 16, 1982, U.S. Pat. No. 4,291,443 issued Sep. 29, 1981, U.S. Pat. No. 4,297,866 issued Nov. 3, 1981, U.S. Pat. No. 5,462,109 issued Oct. 31, 1995, and U.S. Pat. No. 5,896,635 issued Apr. 27, 1999 to Cominco Ltd., incorporated herein by reference. The expanded mesh is then pasted and divided into individual battery plates that can be placed in a battery.

The minimum and maximum grain sizes of the extruded strip will vary with the thickness of the strip but can be controlled by means of rapid cooling with water spray after the strip exits the extruder die. The microstructure of extruded alloy strip is homogenous, stable and can be easily controlled through machine parameter adjustments. With the correct choice of alloy and grain size, the vertical growth of positive grids in the lead-acid battery, made with extruded strip, can be greatly reduced. When compared with the current continuous processes for strip production, the growth of the positive grid is reduced by 50–75% in common laboratory testing. Weight loss caused by corrosion of the grid is similar to that of grids produced from continuously cast strip, and is less than that of rolled strip or bookmold grids. In extrusion, the strip can have different grid thicknesses over the width of the strip by control of the strip profile. This allows plates to be made with very thin wires, while still having a lug thickness sufficient to overcome manufacturing problems associated with thinner lugs. This leads to a significant weight savings in the negative plate and reduces the overall weight and cost of the battery. It has been found that by modifying the die block to allow for strip production rather than tube production, planar high-quality lead alloy strip can be produced of a desired profile. By introducing a novel strip cooling system, which preferably is a water spray system outside of the extruder dieblock, the strip can be optimized in alloy composition, grain size and thickness for fabrication of battery plates for use in lead-acid batteries.

The main advantage of the extrusion strip production method is the absolute control over the grain size and grain structure of the material. This allows for the optimization of these parameters for reducing corrosion, limiting corrosion induced growth, increasing strength, and manipulation of the aging process of the alloy.

Specifically, there are eight areas for optimizing strip and the resultant grids in a battery.

1. Grain Size: Extrusion offers the possibility of controlling the actual grain size of the final product over a wide range, from 20 microns to 500 microns. It should be noted that the minimum grain size will be further influenced by strip thickness and strip alloy composition. While it is possible to produce grain sizes anywhere in this range by modifying the cooling distance from the dieblock exit or the cooling rate, it should be noted that for battery performance it is preferred that the grain size for positive electrodes be in the range of 100–500 microns, most preferably in the range 100–300 microns. This is because at very small grain sizes of less than 100 microns, e.g. 20–100 microns, the grain boundary path for corrosive attack is almost straight through the material along the boundaries of very many grains. At very large grain sizes of greater than 100 microns, the path is also quite straight along the path of only one or two grains. Negative electrodes, however, are not subjected to corrosive attack and small grain sizes down to 10–30 microns are acceptable.

2. Grain Structure: Extruded strip produces a homogenous, equiaxed grain structure that is unlike any other strip production method. In conventional continuous casting the grains are columnar and very long. This can lead to a very straight path for corrosion along grain boundaries through the entire thickness of the strip, leading to significant grid growth in the battery. Rolled strip has a very heterogeneous, stratified structure with significant defect structure throughout the thickness of the strip. While this structure does impart high strength, it also allows significant corrosive attack on the strip, leading to very high weight loss due to corrosive attack at the defect sites. The deformed grains simply are peeled away, layer by layer, by the corrosive attack. With the extruded strip, the equiaxed, homogenous structure, with an optimized grain size, having about 6–10 grains (100–300 micron grain size) through the thickness of the material, provides a very limited defect structure and also presents a long and winding path for corrosive attack on the grain boundaries of positive electrodes. In order for corrosive product to penetrate the strip and proceed through the thickness of the strip, the grain boundary path would be quite long and would slow the process down significantly.

3. Strip Tolerance: The extruded strip can be produced with extremely accurate physical dimensions with strip thickness tolerances of +/−0.025 mm. There is no need to trim the edges of the resultant strip as it can be produced to the exact width that is required without affecting the properties of the strip near the edges.

4. Alloy: Extrusion offers a wide range of possible alloys, similar to that of continuous casting or rolled strip. There are some elements that should be avoided in the alloy composition for extruded strip. These include aluminum, bismuth and sulphur, which will preferentially deposit on the extrusion screw, increasing the friction on the screw as it transports the lead to the die block. At a certain point the friction forces will cause the lead to stop moving in the screw housing, leading to down time for maintenance and cleaning of the screw.

5. Lead Placement (Strip Profile): With extruded strip, the lead passes through a machined die in order to achieve the strip profile necessary (i.e. strip width and thickness). With this in mind the strip can be profiled such that there is sufficient lead thickness for lug welding and conductivity; however the wire thickness can be decreased in order to reduce the weight of either a positive or negative plate. It is most useful in the negative plate, since the thickness of the strip can be significantly reduced between the top and bottom borders of the grid. This can also be useful in relocation of metal in the positive grid for conductivity reasons.

6. Porosity of the Strip: It is well known that the extruded lead product has zero porosity. This has been extremely important in the submarine cable industry, as any level of porosity could lead to seawater intrusion and cable failure, at a huge expense to the owner/operator of the cable. Thus many tests have been done on the extruded product to prove that there is absolutely no porosity, which is desirable for battery strip since any defects such as porosity can lead to aggressive corrosion attack. In continuous cast strip the level of porosity is quite low, although there is some minor levels, depending on alloy composition, casting speed, etc. Rolled product can have significantly high levels of porosity due to inclusions and impurities that are trapped in the product during the rolling process. Book mold grids, while not continuous, have very high levels of porosity that can lead to plate failures due to very high weight loss through corrosion. The pores, which are defects in the product, lead to more surface area that is open to corrosion attack.

7. Grid Design: With the extruded strip the mechanical properties are quite impressive. There is a high initial tensile strength (which varies with alloy) and a very high elongation (>40%) before yield. This elongation stays high through the early aging process, which allows the use of high elongation tooling in a rotary expansion system. The use of higher elongation tooling allows the diamond design of battery grid mesh to be almost square, thereby bringing the SWD/LWD ratio close to 1. In the diamond the SWD is height from the top of the diamond to the bottom and the LWD is the width of the diamond. This will aid in reducing growth, as the material is physically stronger in the vertical direction with this type of geometry as compared to grids produced with conventional elongation tools. Conventional SWD/LWD ratios, as shown in FIG. 4, are much less than 1.

8. Aging of the Strip: It has been shown that both continuous cast and rolled strip product will suffer from overaging after a certain period of time, as shown in FIG. 5. This phenomenon, which is dependent on alloy composition and environmental conditions, significantly decreases the strength of the grid material, thereby increasing the possibility of grid growth. It has been shown that in standard 60° C. aging tests, rolled strip will significantly overage after approximately 90 days. Continuous cast material, dependant on alloy composition, can extend this period. It has been found in extruded strip that the aging process continues for upwards of 130 days without any significant overaging. This does not seem to be dependant on the alloy composition, however there is some effect from the grain size, with the smaller grain sizes in the range of 10 to 30 microns having a lower overall strength reduction of approximately 10% after significant aging. In its broad aspect, the method of producing a lead alloy strip for battery electrodes comprises extruding a lead alloy through a die block to produce an extrusion having a desired shape and rapidly cooling the extrusion to acquire a lead alloy grain size in the range of about 10 to 300 microns. More particularly, the method comprises extruding the lead alloy in the shape of a substantially planar profile or in the shape of a tube extrusion, slitting and opening the tube, and rolling the opened tube into a planar strip prior to rapidly cooling the extrusion. The planar strip preferably is cooled under tension and the cooled wound strip into a coil. The method additionally comprises slitting and expanding the cooled planar strip into an expanded grid by rotary expansion or by reciprocating expansion, punching, machining, waterjet cutting, spark cutting or laser cutting. Expanded grids are particularly suited for use as a battery electrode, such as in lead-acid batteries.

BRIEF DESCRIPTION OF THE DRAWINGS

The process of the invention and the products will now be described with reference to the accompanying drawings, in which.

DESCRIPTION OF THE PREFERRED EMBODIMENT

Figure 1:
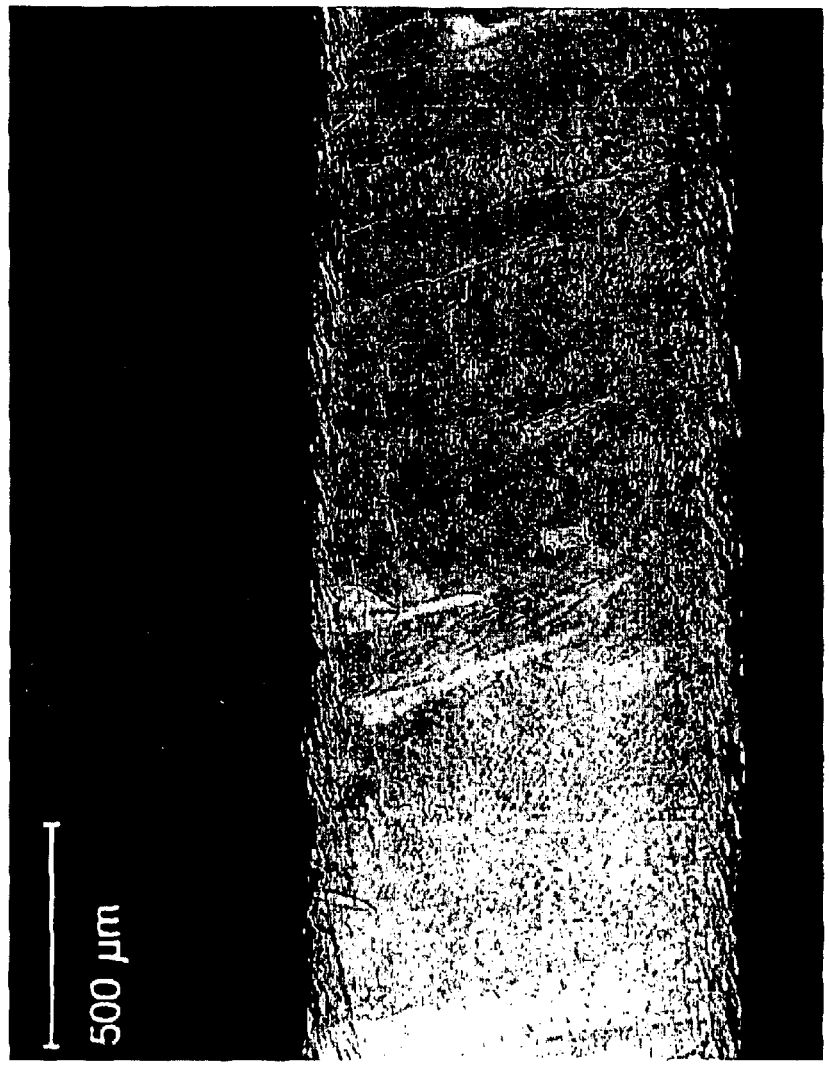
FIG. 1 is a photomicrograph of a cross-section of a conventional continuous cast strip of a typical alloy showing columnar or grain structure.
Figure 2:
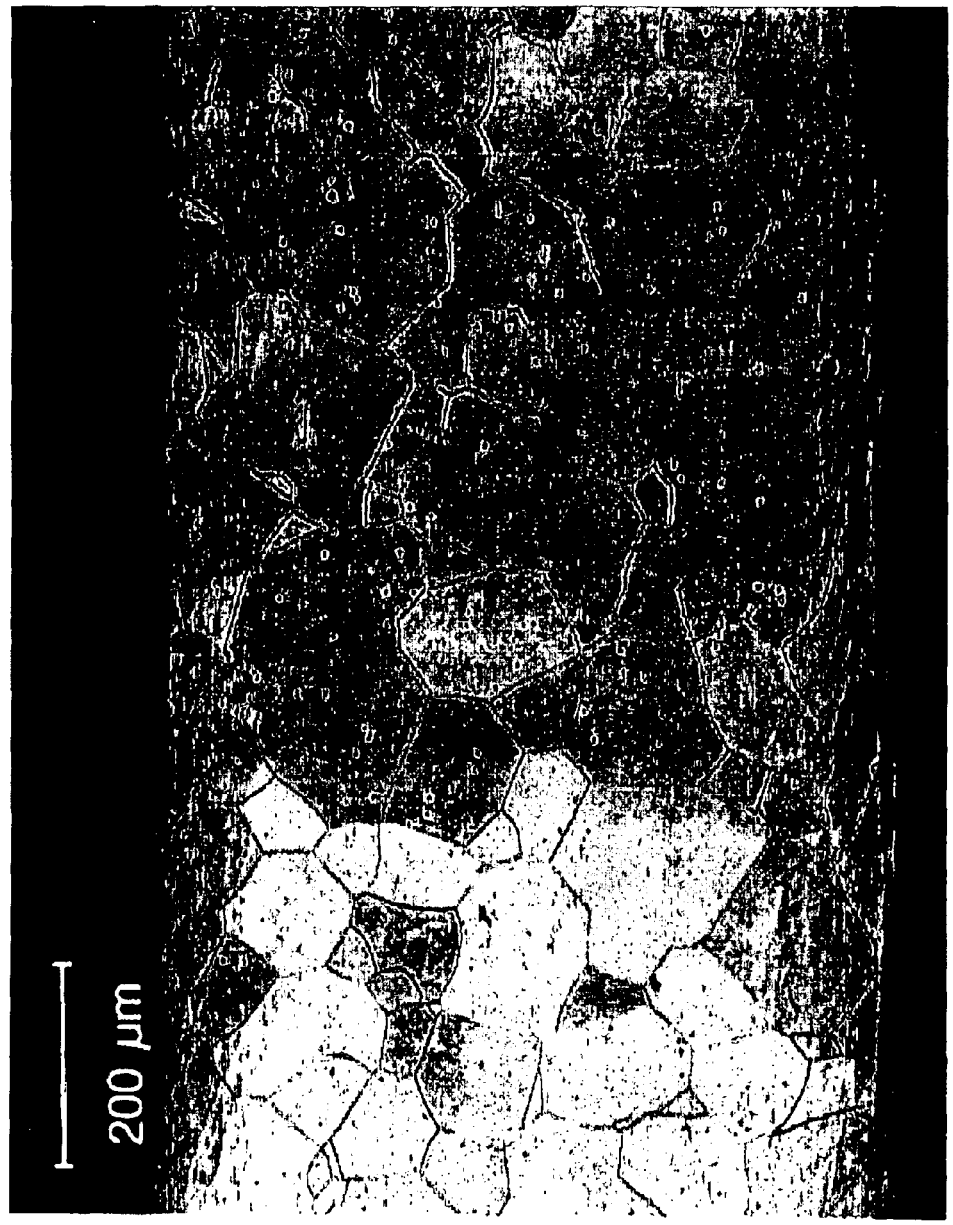
FIG. 2 is a photomicrograph of a cross-section of a continuously extruded strip of an alloy produced according to the method of the present invention.
Figure 3:
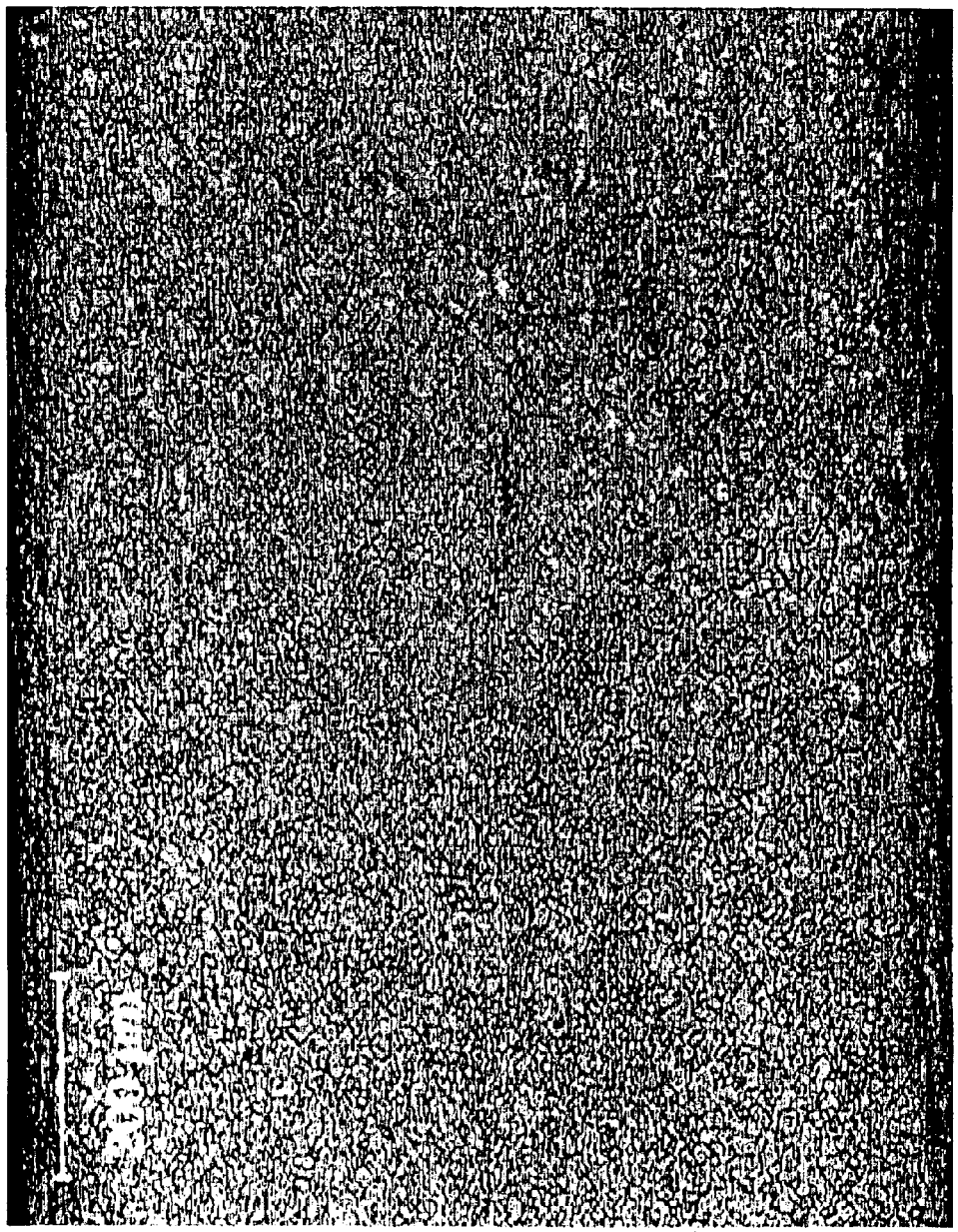
FIG. 3 is a photomicrograph of a cross-section of a continuously extruded strip of an alloy produced according to the method of the present invention for use in negative electrode manufacture.

An H. F. Sandelin™ extruding machine was modified extensively in order to allow for the production of battery strip. The die block was re-engineered to allow for the production of flat strip rather than the conventional cable sheath, and the control system was modified to simplify the operation and to save space in crowded battery manufacturing facilities. The system was further modified by the addition of an outside strip cooling system that allows the lead alloy strip to exit the die block hot and to be cooled under controlled conditions to allow time for the grains to grow to the desired grain size. If the strip is cooled too soon, the grain size is very small, and if it is cooled too late, the grain size is very large. Although very fine or very coarse grain sizes can be produced, they are not optimal for use in battery production, due to poor performance under various tests conditions. FIG. 1 illustrates the columnar grain structure of a conventional, prior art continuously cast strip of a lead alloy. FIG. 2 shows by comparison a homogenous equiaxed lead alloy grain structure of the invention having a grain size in the range of 100–300 microns. FIG. 3 shows a relatively fine-grained, homogenous, equiaxed lead alloy grain structure of the invention in the range of 10–30 microns.

Figure 4:
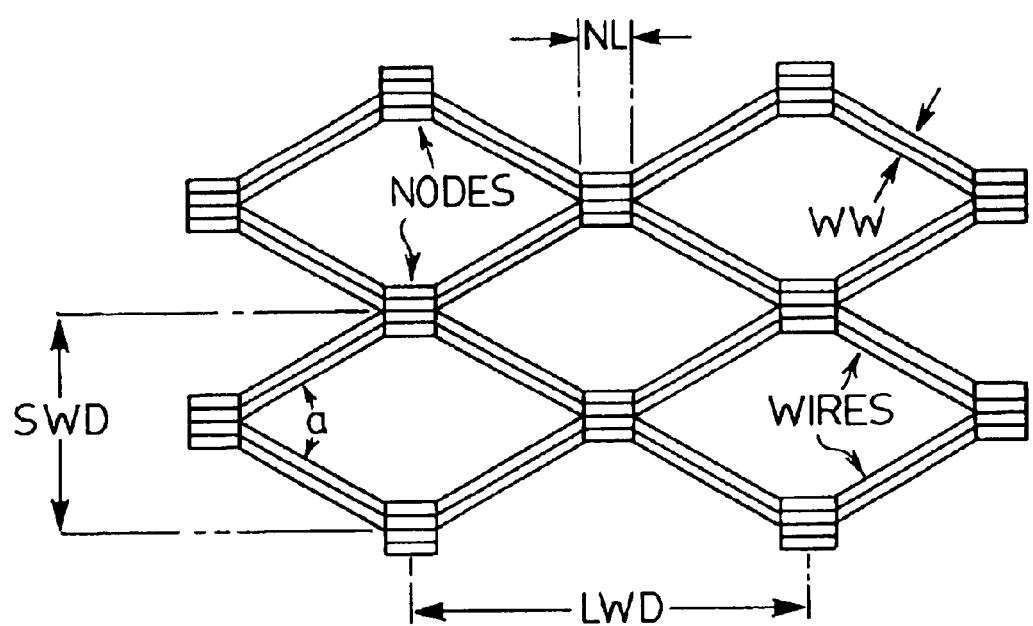
FIG. 4 is a schematic plan view of a battery grid identifying grid components.
Figure 9:
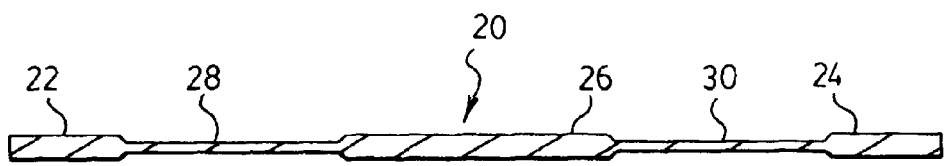
FIG. 9 is a cross-section of a typical strip extrusion, showing the strip profile.

FIG. 9 illustrates a cross-section of a typical profile 20 of an extrusion of lead alloy suitable for expansion to a diamond design mesh such as shown in FIG. 4, by means of rotary expansion as described in detail in U.S. Pat. Nos. 4,291,443 and 4,315,356. Although rotary expansion in a preferred method of expansion, expansion can be effected by reciprocating expansion, punching, machining, waterjet cutting, spark cutting or laser cutting. Exemplary profile 20 has relatively thick side edges 22, 24 and central portion 26, with thin intermediate sections 28, 30, to allow the provision of adequately thick lugs in finished battery plates for good grid support and good electrical connections while allowing the expansion of thin mesh strands between the lugs. This result in substantial weight savings by decreasing the mass of battery plates while allowing an increase in the amount of active paste material in negative plates compared to conventional battery plates, to enhance battery performance and extend battery life. The use of profiled positive and negative battery plates to decrease overall plate thickness enables the production of thinner pasted plates which are particular suitable for 36-volt applications.

Figure 10:
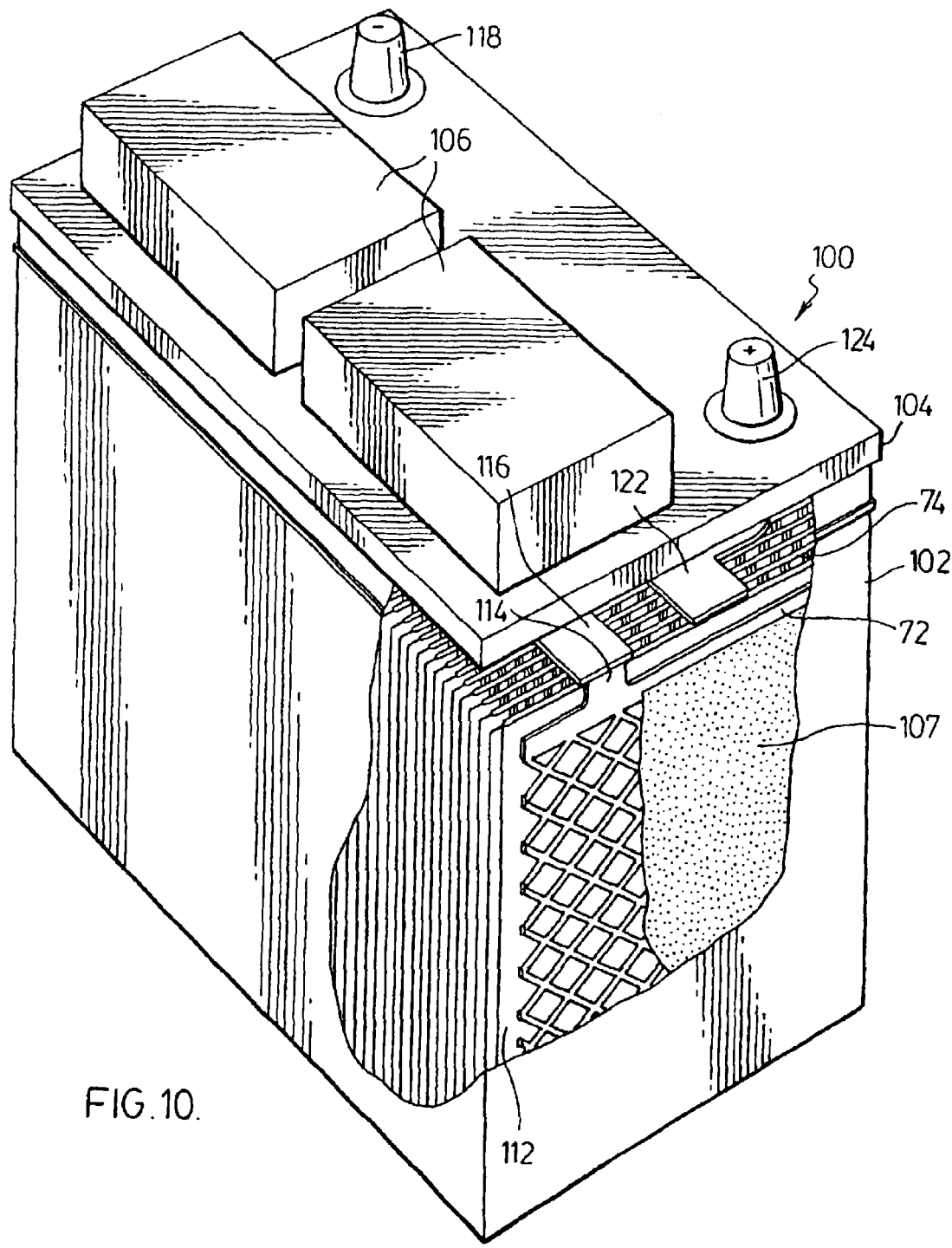
FIG. 10 is a perspective view, partly cut away, of a battery having battery plate grids produced from strip extrusions of the invention.

FIG. 10 illustrates a battery 100 having a plastic casing 102 with cover 104 including vent covers 106 containing extruded and expanded battery electrode plates produced by the method of the invention. The plates including paste 107 are stacked vertically as negative plates 72 alternating with positive plates 74 separated from one another by plate separators 112. The grid tabs 114 of negative plates 72 are interconnected by metal header 116 to negative battery post 118 and the grid tabs (not shown) of positive plates 74 are interconnected by metal header 122 to positive battery post 124. Sulphuric acid solution, not shown, is added in an amount to submerge the battery plates for operating the battery.

It should be noted that while it more preferable to produce flat strip having a desired profile by modifications to the die block, it is not absolutely necessary for the purposes of producing good quality battery strip. It is possible to produce a lead alloy tube and, by adding a knife edge to a conventional cable sheathing die, to slit the tube by the knife and subsequently open and flatten the tube. This opening and flattening process can be done either prior to the quenching of the metal or after the quenching. It is preferable to slit and open the tube prior to the quenching, due to the fact that it is mechanically easier to open the strip and flatten it while it is still at an elevated temperature. The Sandelin™ extruder is capable of production rates in excess of 78–156 ft/min (25–50 kg/min) or of strip, depending upon the alloy.

A good quality lead alloy required to obtain good results, is typified by but not limited to an alloy comprising 0.05–0.09 Ca 0.6–1.8 Sn, 0.01–0.06 Ag with the balance Pb. More preferred is the alloy 0.06–0.08Ca, 1.4–1.6 Sn, 0.010–0.035 Ag, the balance Pb.

A highly accurate control system that regulates the temperature in the extruder screw housing of the lead extruder within +/−1° C. for continuous extrusion, a water cooling system and strip drying system to control grain size, and a constant tension strip winder, are required.

The lead extruder consists of a base frame, gearbox, lubrication unit for the gearbox, main motor, screwhousing, extrusion screw, cooling system for the screw housing, die block, feedpipes and inlet pipes and a melting pot, well-known in the art, as marketed by H. Folke Sandelin AB under the trade-mark the HANSSON-ROBERTSON continuous lead extruder.

Lead alloy is loaded into the electrically heated melting pot and heated to a temperature of about 380° C. The molten alloy passes through the various zones of the melting pot, typically three zones, and then to the gravity feedpipe, via the melting pot outlet valve. The electrically heated feedpipe allows the alloy to pass through its omega construction to the straight inlet pipe and into the screwhousing. Liquid lead is very hygroscopic and can pass through openings that water cannot penetrate, so when the liquid material arrives at the screwhousing it needs to be made plastic before it can be transported by the rotating extrusion screw within the screwhousing. Regulated amounts of cooling water are applied to the three cooling zones of the screwhousing to reduce the alloy temperature below the melting point (melting point of lead is 327° C.). Once transportation starts, the alloy is forced at pressures up to 2000 atmospheres (203 MPa) into the die block. The die block forms the lead into the shape required as it passes through the die. At this point the temperature of the material is approximately 200° C. After extrusion the strip is cooled at preset positions (according to alloy) to achieve the desired grain size. The further away the cooling is from the die block exit, the larger the grain size will be.

The output of the extruder varies depending on the alloy chosen. Pure lead and binary alloys of Pb-Sn can be output at up to 50 kg/min, whereas ternary and quaternary alloys have outputs of 23–30 kg/min.

For satisfactory results for positive electrode strip, grain sizes should be kept in the range of about 100–300 microns. Very small grain sizes can lead to significant vertical growth due to the relatively straight grain boundary path through the thickness of the material. Very large grain sizes, with only 1–2 grains through the thickness of the strip, can lead to the same problems for the same reason. Small grain sizes in the range of 10–30 microns however are suitable for negative alloy strip since the negative electrode is not subjected to corrosive attack due to the electrochemical characteristics of lead acid batteries.

In the production of negative grid electrodes, high levels of calcium are typically added in order to increase the mechanical strength of the grid. This increases the ease of handling during manufacturing. With the level of calcium additions ranging from 0.08 to 0.10 wt %, there is often a high level of calcium loss due to oxidation during the production process, prior to the strip actually being fabricated. With the extruded strip, with a very fine grain size the initial age hardening is quicker than for other grain sizes. It is during this initial period of 2–3 days that handling is important. In order to achieve the same mechanical strength as a continuous cast negative strip with 0.08 wt % calcium, it is possible to produce an extruded strip with a lower level of calcium (0.05–0.07 wt % calcium). This will lead to less alloying elements required, which lowers the cost of production. Also, by the configuration of the melting pots in series with the extruder, oxidation of the lead alloy in the pot is minimized, thereby minimizing losses of calcium prior to strip production.

High tensile strength alloys are preferred, with high calcium alloy providing the best results. Thus, the key operating parameters are alloy choice and quenching position, which controls the grain size.

The product of the invention will now be described with reference to the following non-limitative examples. An accelerated test that has adequately screened grids produced from either conventional continuous cast strip, rolled strip or book mold processes is detailed as follows.

Battery size grids are produced by the method desired. The bare, unpasted, grids are placed into a cell that contains 1.270sg sulphuric acid, at a temperature of 75° C. Counter negative electrodes of a typical negative alloy are placed between each positive grid that is to be tested. Typically each cell will hold between 4 and 16 positive grids for testing. A constant overpotential of 200mV versus the mercury reference electrode is applied to the positive grids. A control grid, which is typically a cast PbCaSnAg alloy, expanded by rotary expansion, is used in order to set this potential. This test runs for 20 days, at which time the grids are removed and the maximum vertical growth of each grid is measured, and the grids are then stripped of corrosion product and the total weight loss is also determined. Comparisons of corrosion performance and vertical growth are then made with the control grid. Positive correlation between this type of accelerated bare grid test and pasted plate performance in batteries was observed.

Comparison with the results of typical rolled product and book mold grids were made. The results of the laboratory testing is shown in the tables below.

EXAMPLE I

Determination of Best Alloy and Grain Size

Figure 6:
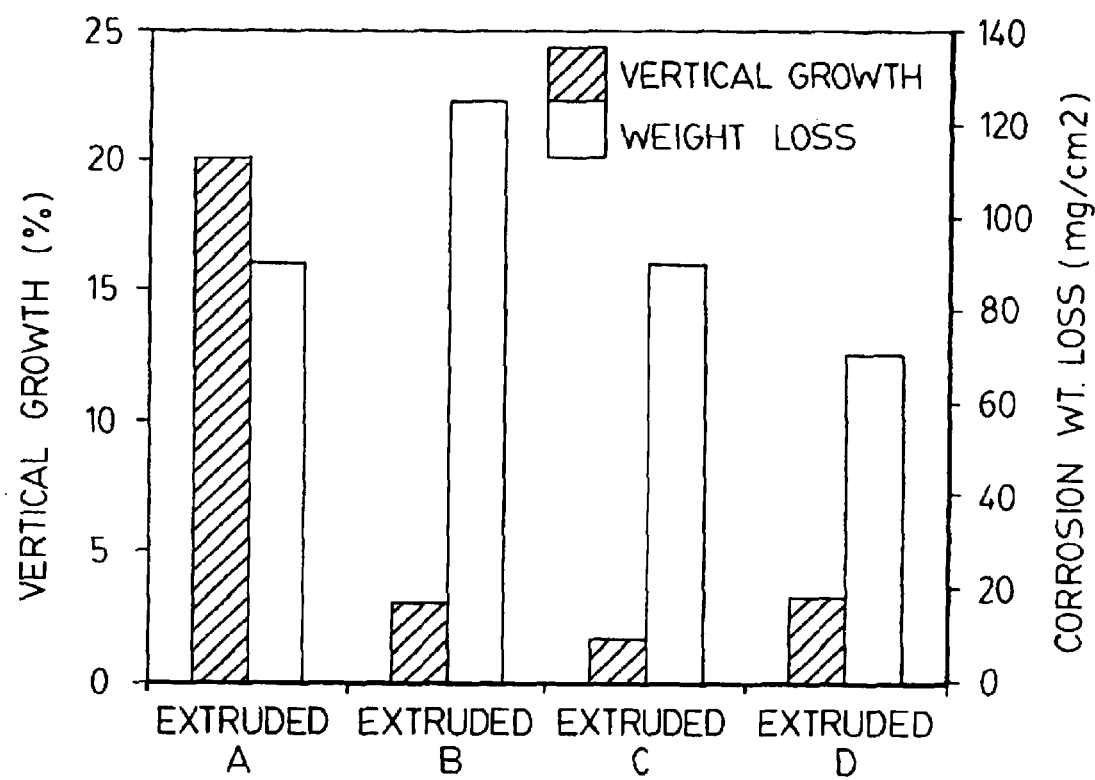
FIG. 6 is a graph showing vertical growth.

Testing was done on several different alloys and each alloy was tested at different grain sizes, done by varying the quenching position of the strip after it exited the dieblock, as shown in FIG. 6 and tabulated in Table 1. Very small grain sizes, in the range of 10–30 microns were also produced by running the extruder in the standard cable sheathing mode, with cooling internal to the dieblock.

TABLE 1

| Alloy Test | Ca % | Sn % | Ag % | Ba % | Sr % | Al % | Average Grain Size |
|---|---|---|---|---|---|---|---|
| Extruded A | 0.00 | 0.88 | 0.062 | 0.00 | 0.035 | 0.00 | 150 microns |
| Extruded B | 0.040 | 0.81 | 0.00 | 0.009 | 0.00 | 0.004 | 150 microns |
| Extruded C | 0.060 | 1.66 | 0.033 | 0.00 | 0.00 | 0.00 | 150 microns |
| Extruded D | 0.072 | 1.74 | 0.00 | 0.00 | 0.00 | 0.00 | 180 microns |

EXAMPLE II

From these initial tests described above, the Alloy C, a CaSnAg alloy was chosen for further examination. The grain size was varied in order to determine what would be the best range for grain size with the extruded strip. It was decided to try three different grain sizes, one with very fine grains (20–30 microns), one with large grains (400–500 microns) and one with the grain size somewhere in between these extreme values (100–300 microns).

Figure 7:
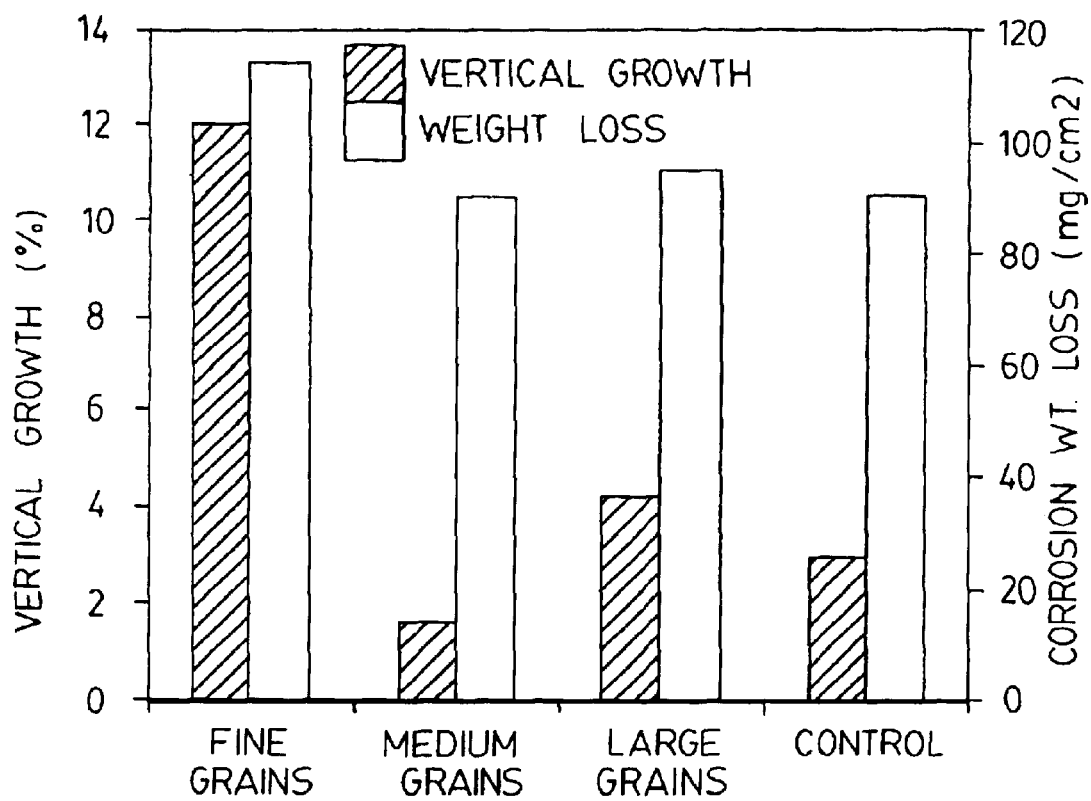
FIG. 7 is a graph showing vertical growth for alloy C.

The testing is summarized as illustrated in FIG. 7.

All of the data shown in FIG. 7 are the average of multiple repeat tests. Each test will vary slightly due to ambient environmental changes, as well as small fluctuations in current and voltage during each test.

As can be seen from FIG. 7, the medium grain Pb 0.06Ca 1.5Sn 0.03Ag (nominal) alloy, with the actual grain size averaging approximately 150 microns, was the best in this testing.

EXAMPLE III

Figure 8:
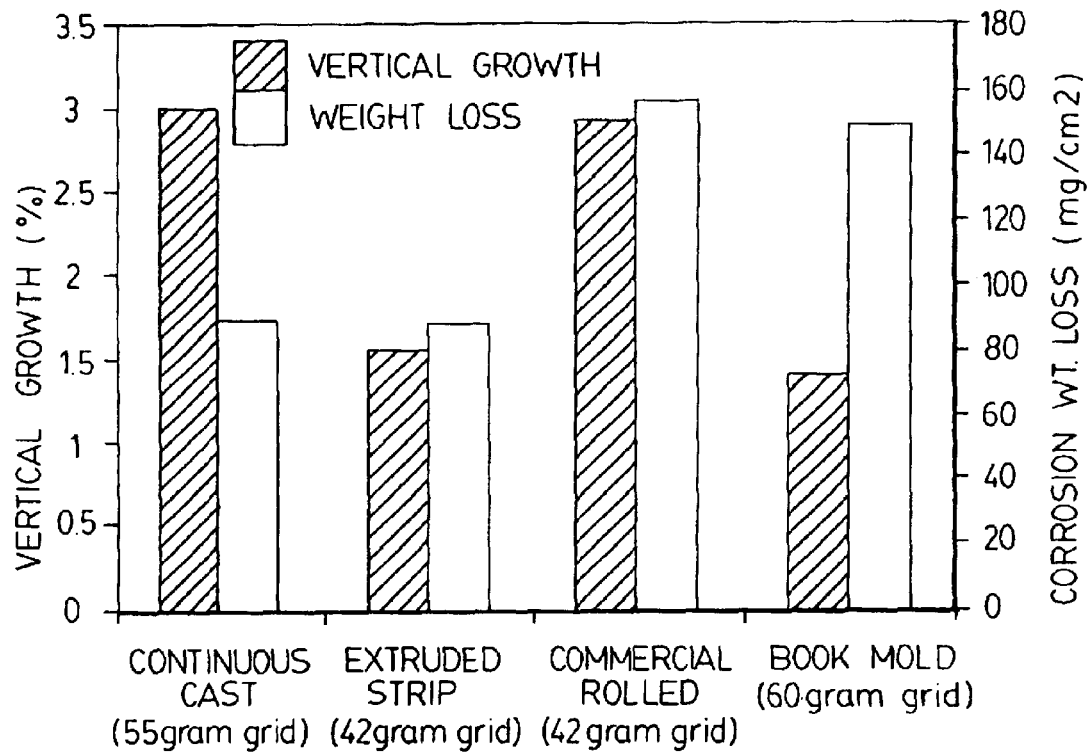
FIG. 8 is a graph showing comparative vertical growth for a battery grid of the invention compared to conventional grids.

These results were compared with those of other continuous processes, as well as the incumbent book mold grids. The results are summarized in the chart of FIG. 8.

The extruded strip is by the most preferred of these methods when grid growth, which is directly correlated to battery life, is compared to the mass of the grid, which is directly related to both the cost of the battery to manufacture, as well as the fuel consumption of the vehicle that the battery will be placed in.

It should be noted that while the Alloy C was the most preferable there is a wide alloy range that would provide acceptable results for strip used to produce battery electrodes, as seen in FIG. 6.

It is possible to produce a wide variety of battery alloys in the Sandelin™ extruder, over a wide range of grain sizes. By the choice of Alloy C, it is not intended to limit the scope of the alloys of the invention, but only to show one particular alloy, with a more specific grain size, that would be considered most preferred.

Figure 5:
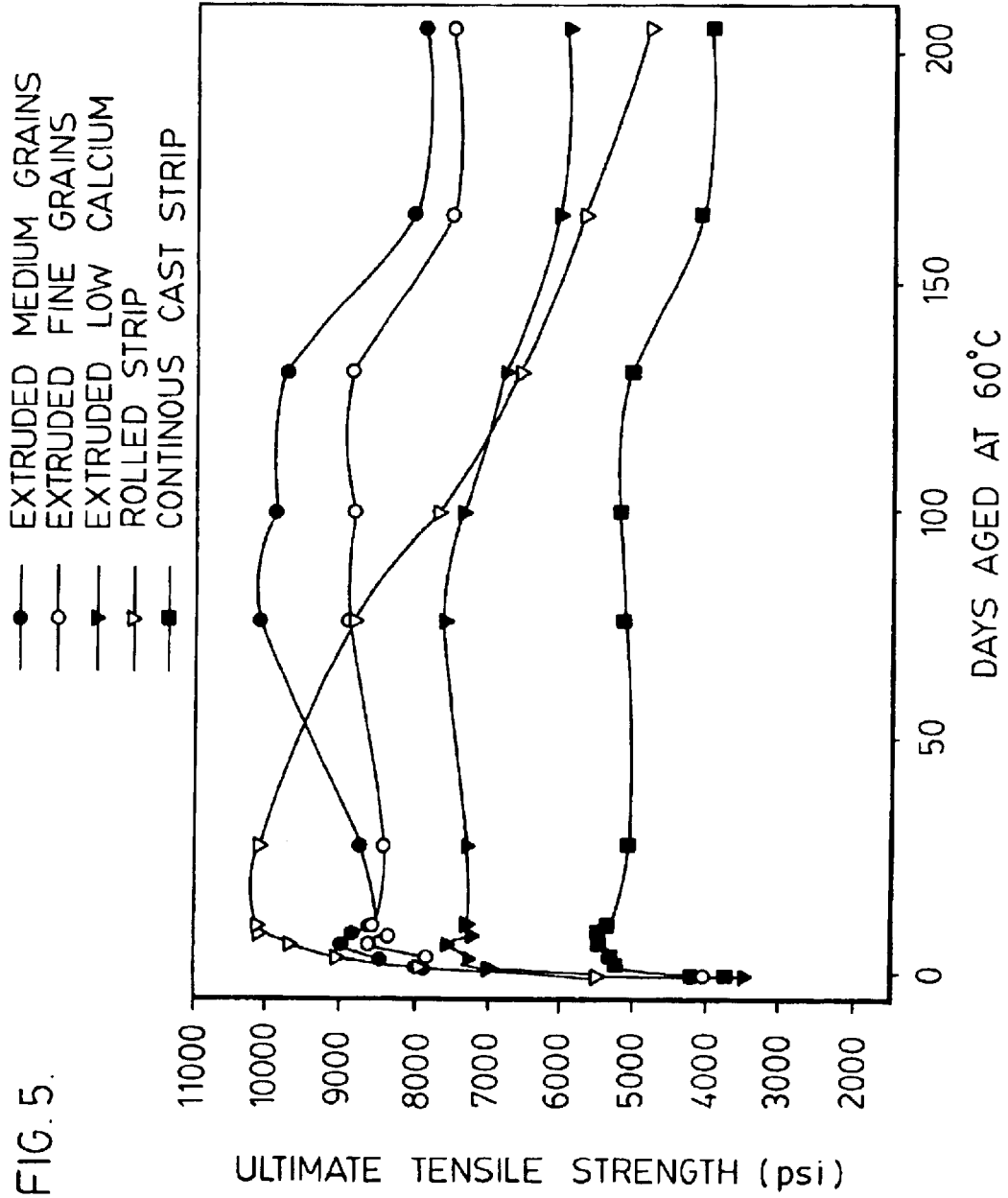
FIG. 5 is a graph illustrating aging of extrusions produced according to the invention compared to aging characteristics of conventional materials.

Aging of the alloy is also quite impressive as indicated in the following graph, as illustrated in FIG. 5.

As can be seen in the graph, the aging characteristics of the extruded strip are quite favourable. When compared to continuous cast and rolled strip of a similar alloy, there are significant differences. The extruded strip is significantly stronger than the conventional continuous cast strip. The conventional rolled material, while initially stronger than the extruded strip overages significantly, as evidenced by the large decrease in tensile strength over time. The extruded strip, of a similar alloy, does decrease slightly from the maximum strength achieved; however the decrease is minor compared to the drop shown in the rolled strip. Also, it is evident that the fine grain extruded material, while aging slightly faster than the medium grain size extruded strip, has an overall lower strength over time. The initial one to three days the strengths are similar, however the data shows the fine grain size material with a slightly higher strength during this short period. It is during this time that the material will be handled during manufacturing. Therefore, for the negative alloy strip, the fine grain size would add some needed strength to the material during the manufacturing and processing window.

It will be understood, of course, that modifications can be made in the embodiments of the invention illustrated and described herein without departing from the scope and purview of the invention as defined by the appended claims.

What is claimed is:

1. A method of continuously producing a lead alloy strip having high initial tensile strength and elongation before yield greater than 40% for battery electrode plates comprising heating a lead alloy containing 0.05–0.09 wt % calcium, 0.6–1.8 wt % tin, 0.01–0.06 wt % silver and the balance lead to a temperature above the melting point of the lead alloy for feeding of the molten lead alloy to an extruder having a die block with a desired die profile, cooling the molten lead alloy below the melting point of the lead alloy, forcing the lead alloy through the die block at a pressure up to 2000 atmospheres to produce an extrusion with zero porosity having a desired strip profile and a homogeneous, equiaxed lead alloy grain structure, and rapidly cooling the extrusion while maintaining the extrusion under tension by quenching to acquire a strip having a homogeneous, equiaxed lead alloy grain structure with a predetermined grain size in the range of 10 to 300 microns.

2. In a method as claimed in claim 1, extruding the lead alloy in the shape of a tube extrusion, slitting and opening the tube, and rolling the opened tube into a planar strip prior to rapidly cooling the extrusion.

3. In a method as claimed in claim 1, extruding the lead alloy in the shape of a planar strip.

4. In a method as claimed in claim 1, extruding the lead alloy to produce an extrusion having a desired profile.

5. A method as claimed in claim 1, in which the lead alloy is heated to a temperature in a temperature range from the melting point of the lead alloy up to 380° C. for feeding of molten lead alloy to the extruder having a screwhousing, cooling the molten lead alloy within the screwhousing to a temperature below the melting point of the lead alloy for extrusion of the lead alloy through the die block, rapidly cooling the extruded strip under tension by quenching and winding the cooled extruded strip into a coil.

6. A method as claimed in claim 1 or 2, additionally comprising slitting and expanding the cooled planar strip into an expanded diamond grid mesh by rotary expansion wherein the ratio of the height of the diamond to the width of the diamond of the diamond grid mesh is up to almost 1.

7. A method as claimed in claim 1 or 2, additionally comprising forming the cooled planar strip into an expanded grid by reciprocating expansion, punching, machining, waterjet cutting, spark cutting or laser cutting.

8. A method as claimed in claim 4, rapidly cooling the extrusion under tension and winding the cooled extrusion into a coil.

9. A method as claimed in claim 4, additionally comprising slitting and expanding the cooled extrusion profile into an expanded grid by rotary expansion.

10. A method as claimed in claim 4, additionally comprising forming the cooled extrusion profile into an expanded grid by reciprocating expansion, punching, machining, waterjet cutting, spark cutting or laser cutting.

11. An extruded lead alloy strip for battery electrodes produced by the method of any of claims 1–5 and 8–10 in which the lead alloy strip has zero porosity and high initial tensile strength and high elongation before yield greater than 40% with a homogeneous, equiaxed grain structure in the size range of 10 to 300 microns.

12. An expanded diamond-grid mesh produced by a method according to any of claim 8 or 9 for use as a battery electrode, said battery grid having a diamond shape with a height of the diamond to the width of the diamond of up to almost 1.

13. A lead acid battery having a plurality of battery electrodes produced by a method according to any of claim 8 or 9.

14. A method as claimed in claim 1 or 2, in which the lead alloy contains 0.06–0.08 wt % calcium, 1.4–1.6 wt % tin, 0.010–0.035 wt % silver and the balance lead.

* * * * *